Jan. 6, 1953 J. H. WEIGAND 2,624,607
RESILIENT COVER MEMBER FOR BUMPER GUARDS
Filed Aug. 17, 1950

INVENTOR.
JAMES H. WEIGAND
BY Albert Sperry.
ATTORNEY

Patented Jan. 6, 1953

2,624,607

UNITED STATES PATENT OFFICE 2,624,607

RESILIENT COVER MEMBER FOR BUMPER GUARDS

James H. Weigand, Trenton, N. J.

Application August 17, 1950, Serial No. 179,903

4 Claims. (Cl. 293—65)

This invention relates to bumper guards for automobiles and is directed particularly to cover members for improving the appearance and increasing the utility of bumper guards.

Many automobiles today are provided with a bumper having vertically extending bumper guards located at the front of the automobile to protect the radiator and grill against injury and extend vertically from the rear bumper to protect the trunk, stop light and other portions of the car at the rear. The bumper guards are generally chromium plated to make them attractive in appearance but they are the first portions of the car to be scratched and dented in parking or in minor traffic accidents or when one car is used to push another. Therefore the chromium plating is soon scratched so that rusting of the bumper guards occurs rendering them unsightly in appearance. Moreover, the noise and shock to the car incident to even a slight contact in parking or traffic is extremely annoying since it upsets a timid driver and causes pedestrians and others to gather around the car to see whether any injury has occurred.

In accordance with the present invention these objections to the constructions of the prior art are overcome by providing bumper guards with a cover member formed of rubber or other yieldable plastic material and by constructing the cover member so that it may be easily applied in a manner to prevent injury to the metal of the bumper guard and to prevent shearing off or displacement of the cover member even when one car is used to push another and is subjected to lateral forces such as those incident to pushing a car around a corner.

In the preferred form of the invention herein shown and described the cover member extends throughout the entire front portion of the bumper guard and about the greater part of the sides of the guard so as to provide effective protection while at the same time resisting displacement of the cover member as a result of laterally directed impact. Moreover, the manner in which the cover member is supported and connected to the bumper guard itself is such as to preclude injury to either the bumper guard or the cover member during use.

One of the objects of the present invention is to provide a novel form of bumper guard for automobiles.

Another object of the invention is to provide an improved form of cover which is adapted for application to the bumper guard.

A specific object of the invention is to reduce the shock and noise incident to the contact of one car with another through the bumper guard.

These and other objects and features of the present invention will appear from the following description thereof in which reference is made to the figures of the accompanying drawing.

Figure 1:
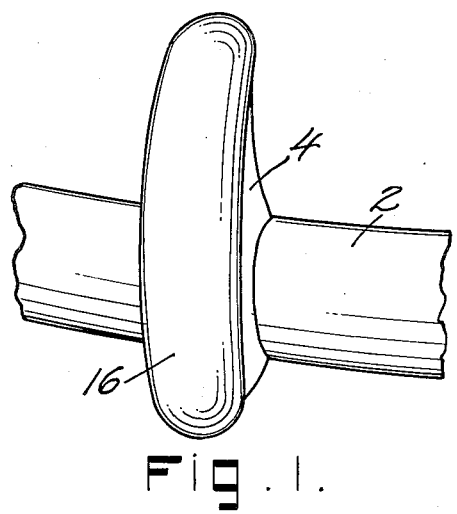
Fig. 1 is a perspective of a bumper guard embodying the present invention.
Figure 3:
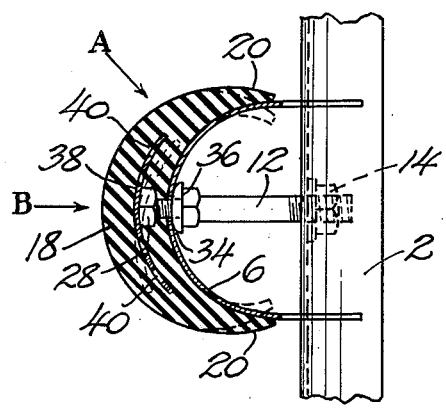
Fig. 3 is a horizontal sectional view through the construction illustrated in Fig. 2 taken on the line 3—3 thereof.
Figure 2:
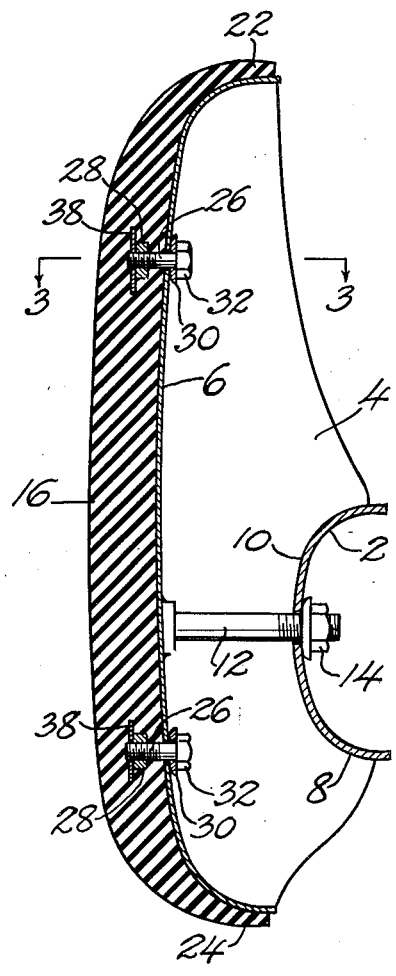
Fig. 2 is a vertical sectional view through the bumper and cover member illustrated in Fig. 1.

In that form of the invention shown in Figs. 1, 2 and 3 the automobile bumper is shown at 2 and is provided with a vertically extending bumper guard 4. The guard may be of any suitable or conventional size, shape and contour, but, as shown, is elongated and projects a substantial distance above the bumper 2 and a relatively short distance below the bumper. The outer face 6 of the guard is rounded or semicircular in cross section and its inner edges 8 are recessed as shown at 10 to conform with the outer face of the bumper. The guard is secured to the bumper by the bolt 12 which projects through the bumper 2 and is engaged by the nut 14.

The bumper guard cover shown generally at 16 is formed of rubber or other yieldable and resilient plastic material. The main body of the cover is generally arcuately crescent shaped in cross section so as to be substantially thicker at the center 18 than at the inwardly extending edges 20. The cavity in the inner face of the body is thus shaped to receive and conform to the outer face 6 of the guard and is supported by the guard throughout the entire area of contact. The inner edges 20 may if desired be initially formed so as to project inward as shown in dotted lines in Fig. 3 to insure an intimate contact and binding action which said edges are spread apart in applying the cover to the guard.

The upper and lower extremities of the cover are also shaped to conform to the rounded upper and lower ends of the guard as shown at 22 and 24 respectively whereby a snug fit is assured.

The cover member is designed to be secured to the guard in a manner to cause the cover to seat firmly on the guard about the entire area which will normally be subjected to blows, scraping or impact in parking the automobile or in traffic or when pushing another car. The attaching means shown are in the form of spaced bolts 26 which project through openings formed in the guard and engage nuts 28 embedded in the body of the cover. Spacing blocks or washers 30 are applied to the bolts 26 beneath the heads 32 of the bolts and are shaped to conform to the inner surface of the guard as shown at 34 while presenting a flat surface 36 for engagement by the heads 32 of the bolts.

The nuts 28 embedded in the body of the cover are each welded or otherwise attached to an anchoring plate 38 which is arcuate in form and substantially parallel to the surface of the cavity and the outer face of the guard. The plate 38 is preferably provided with a number of perforations 40 through which the rubber of the body extends so as to secure the plate to the body without danger of splitting the rubber when the bolts 26 are tightened.

The cover preferably extends throughout substantially the entire surface of the guard which projects outward beyond the bumper and thus all blows or impacts which would normally be taken by the guard are instead applied to the cover and thereby cushioned and absorbed without injury to the guard. Moreover, the clash of metal contact in parking or traffic is entirely eliminated by the sound deadening contact with the rubber cover member.

The intimate and extended contact between the guard and cover about the sides of the guard is such that the cover cannot be stripped off by laterally directed forces. Moreover, the shearing effect resulting from pushing a car around a corner as represented by the arrow A in Fig. 3 will tend to tilt the anchoring plate to the dotted line position producing an increased binding action by compression of the rubber throughout an extended area where the greatest tendency for displacement of the cover with respect to the guard occurs. Therefore the cover is automatically pressed into contact with the guard with the greatest force at the area of greatest strain.

When forces are exerted directly against the cover as represented by the arrow B in Fig. 3 the portion of the rubber in front of the reinforcing tends to spread transversely, whereas the arcuate reinforcing plate causes the portion of the rubber between the reinforcing plate and the guard to be compressed and urged into frictional contact with the outer surface 6 of the guard. Therefore, even if the impact is so great as to force the head of the bolt 32 inward away from the inner face of the guard displacement of the cover will not occur.

Figure 4:
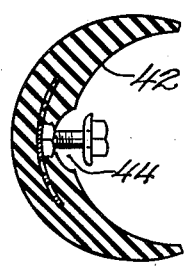
Fig. 4 is a horizontal sectional view through an alternative form of cover member embodying the present invention.

In the alternative form of the invention shown in Fig. 4 the cavity 42 in the cover is formed with a central depression 44 which corresponds in shape and position to the central protrudings and decorative rib with which some bumpers are formed. The same shape and style of cover can therefore be applied to bumper guards of different configuration without change.

While the constructions shown indicate that two bolts and two separate reinforcing plates may be employed, it will be apparent that any number of bolts and attaching plates may be provided and the reinforcing plate may be extended so as to be unitary throughout the length of the cover from one bolt to another.

These and other modifications and changes may be made in the form, construction and arrangement of the elements without departing from the teachings of the invention. In view thereof it should be understood that the particular embodiments of the invention shown in the drawing and herein described are intended to be illustrative only and are not intended to limit the scope of the invention.

I claim:

1. A cover for a bumper guard comprising a body formed of yieldable resilient plastic material and substantially crescent shaped in cross section, the cavity in the body being shaped to present a yielding inner surface which will conform to the outer surface of a bumper guard so as to fit snugly against the outer face of the guard throughout substantially the entire surface of the guard in front of the bumper, an anchoring plate embedded in said body and having threaded means thereon for receiving a bolt, said plate being arcuate in cross section and conforming generally to the cross section of said body, and a bolt positioned to extend through a hole in the guard from the inner side thereof into engagement with the threaded means on said anchoring plate.

2. A cover for a bumper guard comprising a body formed of yieldable resilient plastic material and substantially crescent shaped in cross section, the cavity in the body being shaped to present a yielding inner surface which will conform to the outer surface of a bumper guard so as to fit snugly against the outer face of the guard throughout substantially the entire surface of the guard in front of the bumper, an anchoring plate embedded in said body and having threaded means thereon for receiving a bolt, said plate provided with perforations through which the plastic material extends to secure the plate thereto, the plate also being arcuate in cross section and conforming generally to the cross section of said body, and a bolt positioned to extend through a hole in the guard from the inner side thereof into engagement with the threaded means on said anchoring plate.

3. A cover for a bumper guard comprising a body formed of yieldable resilient plastic material and substantially crescent shaped in cross section, the cavity in the body being shaped to present a yielding inner surface which will conform to the outer surface of a bumper guard so as to fit snugly against the outer face of the guard throughout substantially the entire surface of the guard in front of the bumper, an anchoring plate embedded in said body and having a nut secured thereto on the inner side of said plate, the plate being arcuate in cross section and conforming generally to the cross section of said body, and a bolt positioned to extend through a hole in the guard from the inner side thereof into engagement with the threaded means on said anchoring plate.

4. A bumper guard for an automobile comprising a member attachable to a bumper and having a vertically extending elongated and rounded outer surface, a cover member formed of resilient plastic material extending over substantially all of the surface of the guard which projects beyond the bumper, said cover being generally crescent shaped in cross section with the inner yielding surface thereof in intimate contact with said elongated and rounded surface, an arcuate anchoring means embedded in the plastic and extending generally parallel to the rounded surface of said guard, nuts secured to the inner surface of the anchoring means, bolts extending through said guard and engaging said nuts, and means between the heads of said bolts and the guard presenting a rounded face engaging the inner surface of said guard and a flat surface engaged by the head of said bolt.

JAMES H. WEIGAND.

REFERENCES CITED

The following references are of record in the file of this patent:

UNITED STATES PATENTS

| Number | Name | Date |
|---|---|---|
| 2,063,958 | Short | Dec. 15, 1936 |
| 2,144,167 | Sanders | Jan. 17, 1939 |
| 2,145,952 | Ryan | Feb. 7, 1939 |
| 2,182,085 | Kellner et al. | Dec. 5, 1939 |